US011036022B2

(12) United States Patent
Hong et al.

(10) Patent No.: US 11,036,022 B2
(45) Date of Patent: Jun. 15, 2021

(54) HOLLOW WAVEGUIDE TERMINATION DEVICE

(71) Applicant: AIRBUS DEFENCE AND SPACE GMBH, Taufkirchen (DE)

(72) Inventors: Un Pyo Hong, Riemerling (DE); Ernst Sommer, Wolfratshausen (DE); Michael Schneider, Neubiberg (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 160 days.

(21) Appl. No.: 13/961,412

(22) Filed: Aug. 7, 2013

(65) Prior Publication Data

US 2014/0044402 A1 Feb. 13, 2014

(30) Foreign Application Priority Data

Aug. 8, 2012 (DE) ..................... 10 2012 015 578.6

(51) Int. Cl.
*H01P 1/26* (2006.01)
*G02B 6/44* (2006.01)

(52) U.S. Cl.
CPC ............ *G02B 6/4471* (2013.01); *H01P 1/264* (2013.01)

(58) Field of Classification Search
CPC ....................................................... H01P 1/264
USPC ........................................................ 333/22 R
See application file for complete search history.

(56) References Cited

U.S. PATENT DOCUMENTS 2,804,598 A * 8/1957 Fano ........................... 333/22 R
2,908,875 A * 10/1959 Blatt ....................... H01P 1/264 252/504
3,001,152 A 9/1961 Winkler
3,641,465 A 2/1972 Price et al.
4,143,380 A * 3/1979 Kyle ........................ H01Q 9/27 343/895
7,868,714 B1 * 1/2011 Sorensen et al. ........... 333/22 R
2005/0017815 A1 * 1/2005 Asao ....................... H01P 1/264 333/22 R
2006/0066467 A1 * 3/2006 Kurihara .............. H01Q 17/008 342/1

FOREIGN PATENT DOCUMENTS

JP S53-113456 10/1978
JP S62-72202 4/1987
JP S63-250902 10/1988
SU 1 467 616 3/1989

OTHER PUBLICATIONS

Printout of http://www.radartutorial.eu/17.bauteile/bt42.de.html (w/ English language translation).
German Search Report conducted in counterpart German Appln. No. 10 2012 015 578.6 (dated Nov. 6, 2012).

(Continued)

*Primary Examiner* — Chris H Chu
(74) *Attorney, Agent, or Firm* — Greenblum & Bernstein, P.L.C.

(57) ABSTRACT

Hollow waveguide termination device utilizing a housing and a cup shaped inner attenuation element arranged therein and made of a material which absorbs electromagnetic oscillations. The attenuation element has a tubular section and a front wall section closing the tubular section on one side.

13 Claims, 1 Drawing Sheet

(56) References Cited

OTHER PUBLICATIONS

European Search Report conducted in counterpart European Appln. No. 13 00 3844 (dated Nov. 13, 2013).
Canadian Office Action conducted in counterpart Canadian Appln. No. 2,823,171 (dated Apr. 24, 2019).
Canada Office Action conducted in counterpart Canada Appln. No. 2,823,171 (dated Mar. 16, 2021).

* cited by examiner

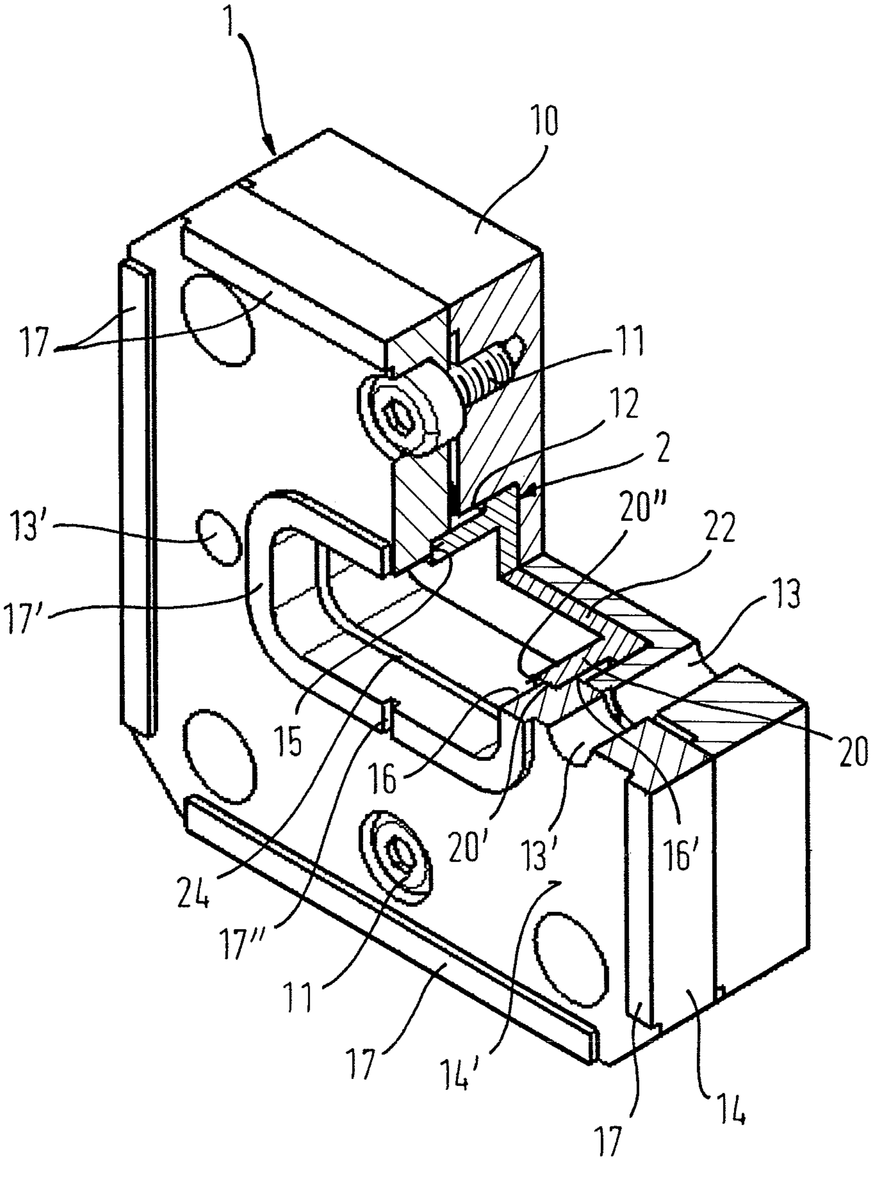
1
10
17
11
12
2
20"
22
13'
13
17'
15
20
16
24
20'
13'
16'
17"
11
17
14'
17
14

HOLLOW WAVEGUIDE TERMINATION DEVICE

CROSS-REFERENCE TO RELATED APPLICATIONS

The present application claims priority under 35 U.S.C. § 119 of German Patent Application No. 10 2012 015 578.6, filed Aug. 8, 2012, the disclosure of which is expressly incorporated by reference herein in its entirety.

BACKGROUND OF THE INVENTION

1. Field of the Invention

The present invention relates to a hollow waveguide termination device that utilizes a waveguide termination housing and an inner attenuation element arranged therein and made of a material which absorbs electromagnetic oscillations.

2. Discussion of Background Information

Hollow waveguides are waveguides for electromagnetic waves that propagate at a frequency in the frequency range of approximately 1 GHz to over 300 GHz. These hollow waveguides, which are typically formed from metal tubes of a differing cross section, are suitable for transmitting waves of frequencies that are this high with low loss. In particular, hollow waveguides of this type are used in radar devices, microwave devices or high-frequency radio units. They are also used in space engineering.

In order to avoid the energy transported in the hollow waveguide being radiated off into the free space at the end of the tubular hollow waveguide, the hollow waveguide must, at the free end, be provided with a termination device functioning as effective resistance. A hollow waveguide termination is a wave pool that serves to cancel the wave energy in the hollow waveguide system. The incident energy is further transmitted with low reflection into the hollow waveguide termination and thereby dissipated to the metal housing as heat in the lossy, oscillation-absorbing material.

Termination devices of this type are known. On the Internet page http://www.radartutorial.eu/17.bauteile/bt42.de.html (accessed on Apr. 10, 2012), for example, a hollow waveguide termination is shown and described. In this example, the hollow waveguide piece is several wavelengths long and filled with graphite-coated sand. This graphite-coated sand forms an attenuation element which is arranged distributed in the inside of the hollow waveguide termination in a cascading or pyramidal manner and incrementally reduces the inner cross section of the hollow waveguide. In such a pyramidal attenuation element, the base of the pyramid is connected to the front face of the hollow waveguide, but normally covers only a small part of the surface of the front face, and has no contact whatsoever with the side walls of the hollow waveguide. This hollow waveguide termination, which must be several wavelengths long due to its design, is not suitable for certain applications in which it is necessary to perform construction in a space-saving manner, for example, in satellite engineering, because of its longitudinal extension.

U.S. Pat. No. 7,868,714 B1, the disclosure of which is hereby incorporated by reference in its entirety, discloses a compact hollow waveguide termination in which the inner circumference of a hollow waveguide is provided with an oscillation-attenuating material in the region of its free end.

For this hollow waveguide termination, the complete reflection at the end of the hollow waveguide is used in order to achieve the double losses, as the wave reflected by the end of the hollow waveguide is likewise attenuated by the attenuation material provided on the inner circumference. In this known hollow waveguide termination, the axial extension of the attenuating material is also extended at the inner circumference to improve the attenuation, whereby the dimensions of the hollow waveguide termination increase.

SUMMARY OF THE INVENTION

The invention encompasses a generic hollow waveguide termination device such that an improvement of the attenuation properties is achieved at a reduced overall length.

This can be attained via a hollow waveguide termination device having one or more features shown in the drawing and/or described herein.

In one non-limiting example, the attenuation element has a cup shaped configuration as well as a tubular section. A front wall section closes off the tubular section on one side.

The provision of an attenuation element having a cup shape of this type, in which attenuation element both the annular circumference and the front-face terminal wall have oscillation-absorbing material, makes it possible to achieve a more pronounced attenuation of the wave energy without the length of the attenuation element having to become greater thereby. The portions of a wave further transmitted by the inner circumferential wall of the tubular section and not absorbed are further attenuated on the front wall and, from there, only that portion of the wave which has not been absorbed by the front wall is still reflected. This re-reflected remainder in turn encounters the tubular section and is once again attenuated there. In comparison with the known hollow waveguide terminating devices, a higher attenuation is achieved at the same effective length of the attenuation element or the overall length of the attenuation element, and therefore of the hollow waveguide terminating device, is reduced at the same attenuation according to the invention.

In addition, the mechanical stability of the attenuation element is markedly improved over the prior art as a result of the cup-shaped embodiment of the attenuation element with a tubular section and a front-face wall section closing the tubular section on one side.

The embodiment of the attenuation element with a front wall section furthermore increases the outer contact surface of the attenuation element, by way of which the attenuation element bears against the hollow waveguide termination housing surrounding it, whereby the conduction of heat from the attenuation element into the hollow waveguide termination housing is improved over the prior art.

Furthermore, the embodiment of the attenuation element according to the invention is tolerant with respect to a potential inhomogeneity of the oscillation-absorbing material. The hollow waveguide termination device according to the invention is also suitable for the attenuation of a broadband frequency spectrum.

The inventive concept is thus to use the face in addition to the inner circumferential surface for the attenuation of the oscillation, on the one hand to achieve an additional attenuation of the wave, but on the other hand to also ensure an extremely stable mechanical design which can be manufactured in a simple and repeatable manner despite the hardness and brittleness of the oscillation-absorbing material.

The principle of operation of the hollow waveguide termination device according to the invention is improved over the prior art in that the wave portions that have not been completely absorbed by the tubular section of the attenuation element and are further transmitted by it impinge on the front face of the attenuation element, which is likewise formed from oscillation-absorbing material. Here, these wave portions are further attenuated and, in case wave portions that are reflected on the front face of the attenuating element should still remain, then these wave portions would once again encounter the tubular part of the attenuation element and are re-attenuated here.

An advantageous development of the hollow waveguide termination device according to the invention is characterized in that the hollow waveguide termination housing has a cover element that is provided with an opening, which is preferably embodied as a blind hole, and in that the cup-shaped attenuation element is inserted in the opening of the cover element. This design allows the hollow waveguide termination device to be assembled in a simple manner and also creates a flexibility such that different attenuation elements can be inserted in the cover element.

It is thereby advantageous if the hollow waveguide termination housing has an inlet element which is embodied for mounting on the cover element and which is provided with a pass-though opening that is flush with the opening of the cover element when the inlet element is mounted on the cover element. The provision of such an inlet element makes it possible to provide, per hollow waveguide band, a standard cover element that accommodates the cup-shaped attenuation element and to perform the adaptation to various sub-bands by means of the inlet element, which then forms an adapter element.

It is furthermore advantageous if the pass-though opening of the inlet element has on its front face facing the cover element a step extending the free cross section and if the free end of the tubular section of the attenuation element inserted in the cover element is embodied to engage with the step in the pass-through opening such that the step hinders the attenuation element from falling out of the opening of the cover element when the inlet element is mounted on the cover element. In this manner, the attenuation element in the hollow waveguide termination housing utilizes a cover element and an inlet element that is captively retained in the opening of the cover part.

In another advantageous embodiment of the hollow waveguide termination device according to the present invention, the free cross section of the pass-through opening is larger than the free cross section bounded by the tubular section such that a step is formed by a part of the face at the free end of the tubular section at the transition from the pass-through opening to the attenuation element. This step preferably extends along the entire circumference of the pass-through opening, preferably without interruption. This adapter step is a combination of the cross section of the hollow waveguide inlet element and the inner and outer cross section of the front wall of the tubular part of the attenuation element. This step forms an adapter step for adapting the incident energy to the attenuation element.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

The sole FIGURE shows a partially cut perspective representation of a hollow waveguide termination device according to one non-limiting embodiment of the invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

In the sole FIGURE there is shown a hollow waveguide termination device according to the invention that utilizes a hollow waveguide termination housing 1 and an inner attenuation element 2 arranged therein.

The tube waveguide termination housing 1 includes a cover element 10 and an inlet element 14, which can essentially have the same cross section dimensions but may have different thicknesses. In the example shown, element 10 is thicker than element 14. The cover element 10 and the inlet element 14 are connected to one another by fasteners such as screws 11 and these are screwed into threaded openings in the cover element 10 from the side of the inlet element 14. The head of each screw 11 is countersunk in an enlarged bore of the inlet element 14.

On a side facing the inlet element 14, the cover element 10 is provided with an opening 12 having the form of a blind hole. Alignment pin bores 13 are provided in the cover element 10 and are, in the assembled state shown, flush with alignment pin bores 13' of the inlet element 14. These alignment pin bores 13, 13' serve to accommodate alignment pins (not shown), that are used to ensure a precise reciprocal positioning of cover element 10 and inlet element 14.

The inlet element 14 is provided with a central pass-through opening 16 that is flush with the opening 12 of the cover element 10 when the inlet element 14 is mounted on the cover element 10. The pass-through opening 16 in the input element 14 widens toward the cover element 10 and/or includes an expanded section 16' and a circumferential step 15. The face of the step 15 faces the cover element 10.

On the face 14' of the inlet element 14 facing away from the cover element 10, there are arranged outer centering strips 17 projecting from the face 14'. These are arranged along the outer edge. An inner center strip 17' likewise projects from the face 14' of the inlet element 14 and surrounds the pass-through opening 16. In this example, the opening 16 has a rectangular shape with rounded-off corners (as seen in cross section). The inner centering strip 17' surrounding the pass-through opening 16 is interrupted at least by one groove 17", which is provided on the longitudinal or longer side of the inner centering strip 17'.

The cup-shaped attenuation element 2 is inserted into the opening 12 of the cover element 10. This opening 12 is embodied as a blind hole. The attenuation element 2, which is made of an oscillation-absorbing material, has a tubular section 20 and a front wall section 22 that closes off the tubular section 20 on one of its sides. In embodiments, element 2 is preferably embodied as a one piece member with both the wall 22 and the tubular section 20 being portions of the same member. The tubular section 20 has a rectangular cross section with rounded-off corners. The length of the attenuation element 2 (measured in a direction at a right angle to the front wall section 22) is greater than the depth of the blind hole bore 12 such that the tubular section 20 projects with its free end 20' from the face of the cover element 10 facing the inlet element 14. The outer dimensions of the tubular section 20 of the attenuation element 2 are dimensioned such that the free end 20' of the tubular section 20 engages properly in the expanded section 16' of the pass-through opening 16 in the inlet element 14. In the assembled state of the hollow waveguide termination device illustrated, the front face 20" of the tubular section 20 bears against or contacts the step 15 of the pass-through opening 16.

The thickness of the wall of the tubular section 20 of the attenuation element 2 is, at least in the region of the front face 20" thereof, greater than the extension of the step 15 measured at a right angle to the axis of the pass-through opening 16, such that the free cross section at the free end 20' of the tubular section 20 is smaller than the free cross section of the pass-through opening 16. This results, in the assembled state illustrated, in the tubular section 20 of the attenuation element 2 in turn forming a step 24 which runs along the circumference of the pass-through opening 16 and the face of which faces away from the cover element 10.

The attenuation element 2, which is loosely inserted in the blind hole opening 12 of the cover part 10 during assembly, is fixed in a mechanically captive or retained manner in the hollow waveguide termination device by way of the step 15 of the pass-through opening 16. The front wall section 22 of the attenuation element 2 and parts of the tubular section 20 are, as a result, placed in planar contact with the cover element 10 and inlet element 14. Elements 10 and 14 are components that can be made of metal, preferably of a suitably heat-conducting light metal (for example, aluminum), such that the heat produced in the attenuation element 2 during the attenuation of high-energy electromagnetic oscillations can be quickly and effectively dissipated to the cover element 10 and the inlet element 14.

The hollow waveguide termination device according to the illustrated invention is connected to the free end of a hollow waveguide such that the free end of the hollow waveguide either engages in the pass-through opening 16 or bears flush against the inner centering strip 17'. The electromagnetic oscillations emerging from the hollow waveguide then enter the pass-through opening 16 of the hollow waveguide termination device according to the invention, and this pass-through opening forms a hollow waveguide inlet. These electromagnetic oscillations are then attenuated on the inner wall of the tubular section 20 and the front wall section 22 of the attenuation element 2.

The energy incident at the hollow waveguide inlet is in large part further transmitted into the attenuation element 2, which forms a cup absorber, and is attenuated there. However, a part of the incident electromagnetic oscillation is reflected at the step 24 formed by a part of the front face 20". The attenuation in the attenuation element 2 and the geometry of the attenuation element 2, in particular, the inner length of the tubular section 20 (measured in the direction of the axis of the pass-through opening 16), is designed such that a returning wave is produced by reflection on the inside of the front wall section 22, the amplitude of which returning wave is equal to the amplitude of the wave reflected at the step 24. The phase of which is however shifted 180° such that this returning wave cancels the wave reflected at the step 24. A cancellation of energy thus results at the inlet by way of the destructive interference of the reflected energy from the front wall section 22 of the attenuation element 2.

Although the cross section of the pass-through opening 16 and the cross section of the tubular part 22 of the attenuation element 2 is shown and described as having a generally rectangular shape with rounded-off corners, both the cross section of the pass-through opening 16 and the cross section of the tubular part 22 of the attenuation element 2 (and therefore also the cross sections of the attenuation element 2 and of the blind hole opening 12) can have any other conceivable shape. Thus, these cross sections can, for example, include shapes such as cylindrical, half-cylindrically, square, etc.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A hollow waveguide termination device comprising:

a hollow waveguide termination housing comprising a cover element and an inlet element, wherein the inlet element is a separate element from the cover element and is configured to be mounted on the cover element, the inlet element has a side face contacting a side face of the cover element when mounted to the cover element, the inlet element including a pass-through opening communicating with an opening of the cover element, and the opening in the cover element having an inner surface that surrounds the pass-through opening and is flush with the side face of the inlet element, when the inlet element is mounted on the cover element;

a cup shaped inner attenuation element, which is made of material which absorbs electromagnetic oscillations and which is arranged in an opening of the cover element that is sized and configured to receive therein the cup shaped inner attenuation element; and the cup shaped inner attenuation element comprising a tubular section and a front wall section closing off the tubular section, wherein a length of the cup shaped inner attenuation element is greater than a depth of the opening of the cover element and the cup shaped inner attenuation element is arranged in the opening so that a free end of the tubular section of the cup shaped inner attenuation element, which is opposite the front wall section, extends into the pass-through opening of the inlet element and ends inside the inlet element, wherein the pass-through opening of the inlet element is configured to widen, on the side face of the inlet element contacting the side face of the cover element, in an expanded section formed by a circumferential step, wherein, when the inlet element is mounted on the cover element, a front face of the free end of the tubular section of the cup shaped inner attenuation element bears against the circumferential step of the pass-through opening, and wherein a thickness of a wall of the tubular section, at least in a region of the front face of the free end of the tubular section, is greater than an extension of the circumferential step in a direction perpendicular to a longitudinal axis of the pass-through opening so that an inner surface of the pass-through opening is flush with the front face of the free end of the tubular section of the cup shaped inner attenuation element and a part of the front face of the free end of the tubular section forms a reflecting step arranged to reflect a part of an incident electromagnetic oscillation.

2. The hollow waveguide termination device according to claim 1, wherein the opening is a blind hole or a blind space.

3. The hollow waveguide termination device according to claim 1, wherein the reflection step extends into the pass-through opening of the inlet element.

4. The hollow waveguide termination device according to claim 3, wherein the free end of the tubular section of the attenuation element axially retains the attenuation element.

5. The hollow waveguide termination device according to claim 1, wherein the reflecting step forms a stepped transition between an inlet side of the pass-through opening and the front wall section.

6. The hollow waveguide termination device according to claim 5, wherein the reflecting step extends along an inner perimeter of the pass-through opening.

7. The hollow waveguide termination device according to claim 5, wherein the reflecting step extends completely and without interruption along an inner perimeter of the pass-through opening.

8. The hollow waveguide termination device according to claim 1, wherein the front wall section has a planar surface that closes off the tubular section.

9. The hollow waveguide termination device according to claim 1, wherein the front wall section has a planar surface arranged to face away from the hollow waveguide termination housing.

10. The hollow waveguide termination device according to claim 1, wherein the inlet element is mounted on the cover element to retain the cup shaped inner attenuation element in the opening of the cover element.

11. The hollow waveguide termination device according to claim 10, wherein the inlet element is mounted on the cover element via screws.

12. A hollow waveguide termination device comprising:

a waveguide termination housing comprising a cover part and an inlet part, wherein the inlet part is a separate element from the cover part and is configured to be mounted on the cover part, the inlet part having an inlet side and a cover part facing side, which contacts the cover element when the inlet part is mounted to the cover element;

a pass-through opening arranged in the inlet part;

a blind space arranged in the cover part, wherein an inside surface of the blind space surrounds the pass through opening and is flush with the cover part facing side when the inlet part is mounted on the cover part;

a cup shaped inner attenuation element that is arranged in the blind space of the cover part, which is sized and configured to receive the cup shaped inner attenuation element, wherein the cup shaped inner attenuation element is axially retained within and between the cover part and the inlet part and is made of material which absorbs electromagnetic oscillations; and the cup shaped inner attenuation element having a tubular section with a closed end that extends into the blind space, an open end and a length between the open end and the closed end that is greater than a depth of the blind space;

wherein the pass-through opening of the inlet part has an inlet side cross-section that is larger than an inner cross section of the tubular section of the cup shaped inner attenuation element and a cover part facing side cross-section, which is enlarged with respect to the inlet side cross-section, so that a circumferential step is formed between the inlet side cross-section and the cover part facing side cross-section, and wherein a part of a face of the open end of the cup shaped inner attenuation element bears against the circumferential step and another part of the face of the open end forms a reflecting step within the inlet side cross-section to reflect a part of an incident electromagnetic oscillation.

13. A hollow waveguide termination device comprising:

a waveguide termination housing comprising a cover part and an inlet part, wherein the inlet part is a separate element from the cover part and is configured to be mounted on the cover part, the inlet part having an inlet side and a cover part facing side, which contacts the cover element when the inlet part is mounted to the cover element;

a pass-through opening arranged in the inlet part;

a blind space arranged in the cover part, wherein an inside surface of the blind space surrounds the pass through opening and is flush with the cover part facing side when the inlet part is mounted on the cover part;

a cup shaped inner attenuation element that is arranged in the blind space of the cover part, which is sized and configured to receive the cup shaped inner attenuation element, wherein the cup shaped inner attenuation element is axially retained within and between the cover part and the inlet part and is made of material which absorbs electromagnetic oscillations; and the cup shaped inner attenuation element having a tubular section with a closed end that extends into the blind space, an open end and a length between the open end and the closed end that is greater than a depth of the blind space;

wherein the pass-through opening of the inlet part has an inlet side cross-section that is larger than an inner cross section of the tubular section of the cup shaped inner attenuation element and a cover part facing side cross-section, which is enlarged with respect to the inlet side cross-section, so that a circumferential step is formed between the inlet side cross-section and the cover part facing side cross-section, wherein a part of a face of the open end of the cup shaped inner attenuation element bears against the circumferential step and another part of the face of the open end forms a reflecting step within the inlet side cross-section to reflect a part of an incident electromagnetic oscillation, wherein the inlet part is mounted on the cover part to retain the cup shaped inner attenuation element in the blind space of the cover element, and wherein the inlet part is mounted on the cover part via screws.

* * * * *